US008200937B2

(12) United States Patent
Dehlinger et al.

(10) Patent No.: US 8,200,937 B2
(45) Date of Patent: Jun. 12, 2012

(54) METHOD OF MANAGING FLASH MEMORY ALLOCATION IN AN ELECTRONIC TOKEN

(75) Inventors: Franck Dehlinger, Meudon Cedex (FR); Francois-Xavier Marseille, Meudon Cedex (FR); Laurent Castillo, Meudon Cedex (FR)

(73) Assignee: Gemalto SA, Meudon Cedex (FR)

( * ) Notice: Subject to any disclaimer, the term of this patent is extended or adjusted under 35 U.S.C. 154(b) by 279 days.

(21) Appl. No.: 12/663,014

(22) PCT Filed: May 30, 2008

(86) PCT No.: PCT/IB2008/001397
§ 371 (c)(1),
(2), (4) Date: Dec. 4, 2009

(87) PCT Pub. No.: WO2008/149194
PCT Pub. Date: Dec. 11, 2008

(65) Prior Publication Data
US 2010/0199030 A1    Aug. 5, 2010

(30) Foreign Application Priority Data
Jun. 8, 2007 (EP) ................................. 07301094

(51) Int. Cl.
*G06F 12/06* (2006.01)
(52) U.S. Cl. .................. 711/171; 711/103; 711/E12.008
(58) Field of Classification Search .................. 711/103, 711/170, 171, E12.008
See application file for complete search history.

(56) References Cited

U.S. PATENT DOCUMENTS

| 6,505,283 | B1 * | 1/2003 | Stoney ........................... 711/170 |
| 6,741,593 | B1 * | 5/2004 | Sun et al. ....................... 370/392 |
| 2004/0001492 | A1 * | 1/2004 | Johnson .................... 370/395.32 |
| 2004/0044837 | A1 * | 3/2004 | Hasbun et al. ................ 711/103 |
| 2007/0174579 | A1 * | 7/2007 | Shin ............................... 711/170 |
| 2007/0186065 | A1 * | 8/2007 | Lee et al. ....................... 711/159 |
| 2008/0104353 | A1 * | 5/2008 | Madisetti ...................... 711/170 |
| 2008/0209154 | A1 * | 8/2008 | Schneider ..................... 711/170 |

FOREIGN PATENT DOCUMENTS
WO    00/49488 A1    8/2000

OTHER PUBLICATIONS

International Search Report from PCT/IB2008/001397 dated Oct. 24, 2008 (2 pages).
Written Opinion from PCT/IB2008/001397 dated Oct. 24, 2008 (6 pages).

* cited by examiner

*Primary Examiner* — Hal Schnee
(74) *Attorney, Agent, or Firm* — Osha Liang LLP

(57) ABSTRACT

The invention is a method of managing flash memory-allocation in an electronic token. Said token has a memory comprising a list area and a managed area. Said managed area comprises allocated spaces and at least one free memory chunk. Said list area comprises at least one valid entry referencing a free memory chunk. Said valid entry comprises a state field. Said method comprises the step of selecting a free memory chunk further to an allocation request where said free memory chunk is referenced by an old entry, and the step of identifying a new allocated space in the selected free memory chunk. The state field of said valid entry is preset with a virgin state. Said method comprises the step of invalidating the old entry referencing the selected free memory chunk.

11 Claims, 4 Drawing Sheets

METHOD OF MANAGING FLASH MEMORY ALLOCATION IN AN ELECTRONIC TOKEN

FIELD OF THE INVENTION

The present invention relates to methods of managing flash memory allocation in an electronic token. It relates particularly to methods of managing allocation of spaces in flash memory like NOR flash memory.

PRIOR ART

The allocation and garbage collector mechanisms used with a flash memory must comply with constraints specific to this kind of memory. For example, NOR flash memory component have the following characteristics. A NOR flash is divided into banks having typically a size of 256 Kbytes. Each bank is usually divided into sectors having typically a size of 4 Kbytes. Each sector is divided into pages, having typically a size of 256 Bytes. Rewriting a byte in page imposes erasing first the complete page containing it. The read access to a byte is direct since there is no need to load the whole page to access a byte. For write operation, access granularity is very high since a unique bit can be written. A write operation corresponds to turn a bit from 1 to 0. Moreover, a page can be programmed/erased a limited number of time.

At the beginning of the cycle of life, content of such a flash memory is preset with a virgin state, i.e. the whole bytes are initialized with a single default value. Generally this virgin state corresponds to smallest or the greatest value which a byte can take (0x00h or 0xFFh).

Flash memories and EEPROM differ a lot. EEPROM are slow, byte-accessible for reads and writes, types of memories; whereas flash memories can be programmed faster, but can only be erased page by page, and their page size can vary a lot.

Allocation system designed for EEPROM are not suitable on flash memories, causing a lot of unnecessary erases and leading to low performances for both allocations and frees. Moreover, those allocation systems cannot use the characteristics of the flash memories to achieve faster allocations.

The invention aims at minimizing the number of erases required for allocation of space in a managed memory.

SUMMARY OF THE INVENTION

The object of the present invention is a method of managing flash memory allocation in an electronic token. Said token has a memory comprising a list area and a managed area. Said managed area comprises allocated spaces and at least one free memory chunk. Said list area comprises at least one valid entry referencing a free memory chunk. Said valid entry comprises a state field. Said method comprises the following steps:
  selecting a free memory chunk further to an allocation request, said free memory chunk being referenced by an old valid entry,
  identifying a new allocated space in the selected free memory chunk.

The state field of said valid entry is preset with a virgin state, and said method comprises the further step of invalidating the old valid entry referencing the selected free memory chunk.

The old valid entry referencing the selected free memory chunk may be invalidated by writing a predefined value in the state field of said old valid entry.

Said method may comprise the further step of requesting a compaction of the list area when said list area contains a predefined number of entries.

Said entries may be sequentially initialized in the list area.

Every allocated spaces and every free memory chunks may be defined by their own size. An old valid entry may comprise a memory chunk identifier associated to a first free memory chunk. Said method may comprise the further step of initializing a new valid entry in the list area if the new allocated space size is smaller than the selected first free memory chunk size. In this case, said new valid entry references a second free memory chunk and has the same memory chunk identifier as the identifier associated to the first free memory chunk.

The allocation request may be defined by a size. Said method may comprise the further step of requesting a compaction of the managed area when the allocation request size is bigger than the size of each free memory chunks.

Another object of the invention is an electronic token containing a microprocessor and a memory. Said memory comprises a list area and a managed area. Said managed area comprises allocated spaces and at least one free memory chunk. Said list area comprises at least one valid entry referencing a free memory chunk. Said valid entry comprises a state field. The state field of said valid entry is preset with a virgin state. Said token comprises means for identifying a new allocated space, in the managed area, for initializing a new entry in the free memory chunk, and for invalidating the old valid entry referencing the free memory chunk where the new space is allocated.

A valid entry of the list area may comprise a memory chunk identifier associated to a first free memory chunk. When a new space is allocated in the first free memory chunk, a new entry may be initialized in the list area. The new entry may reference a second free memory chunk and may have the same memory chunk identifier as the identifier associated to the first free memory chunk.

Each entry may comprise at least one availability field indicating if said entry is used or unused. The unused value may correspond to a virgin state of the availability field.

The number of entries initialized in the list area may be limited to a preset threshold.

The memory may be a NOR flash memory.

The token may be a smart card, a mobile phone, a portable audio device, a portable navigation device or a memory token.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of electronic token. In this specification, the electronic token is a smart card but it could be any other kind of electronic token or portable device using a flash memory. The list area is managed as a journalized list of entry where entries are sequentially initialized in said list.

Figure 1:
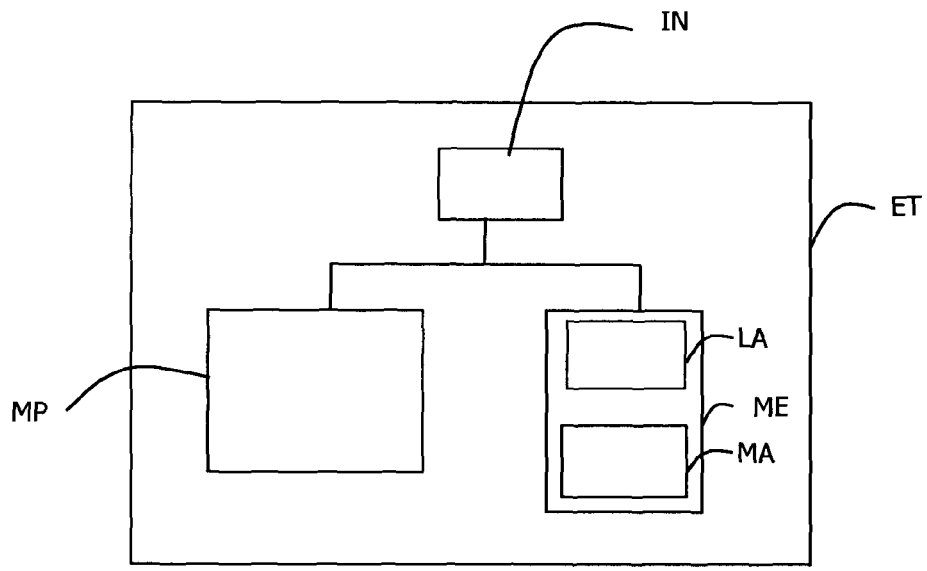
FIG. 1 depicts schematically the architecture of an electronic token of smart card type according to the invention.

FIG. 1 shows the architecture of a smart card as an example of an electronic token according to a preferred embodiment of the invention. The smart card ET contains a microprocessor MP, a communication interface IN and a flash memory ME. The flash memory ME contains a list area LA and a managed area MA.

The memory ME may consist of a unique circuit or several circuits that may be of different types.

Figure 2:
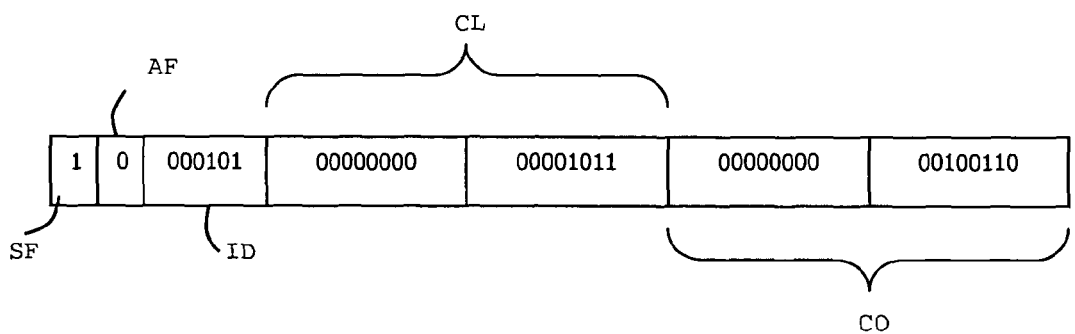
FIG. 2 depicts an example of structure for an entry of the list area according to the invention.

As shown in FIG. 2, each entry of the list area may have a structure comprising a state field SF, an availability field AF, a memory chunk identifier ID, a memory chunk length CL and a memory chunk offset CO.

In a preferred embodiment, an entry is coded on five bytes. The availability field AF is coded on one bit indicating if the entry is unused or used. For example, 1 means that the entry is unused and 0 means that the entry is used. The state field SF, may be coded on one bit indicating if the entry is valid or invalid. For example, 1 means that the entry is valid and 0 means that the entry is invalid.

The memory chunk identifier ID may be coded on six bits. Each valid entry has a unique identifier.

The memory chunk length CL corresponds to the size of the referenced free memory chunk. The memory chunk length CL may be coded on two bytes and the memory chunk offset CO may be coded on two bytes. The memory chunk offset CO corresponds to the offset where the referenced free memory chunk is located in the managed area MA.

FIG. 2 shows an example of a valid entry having a memory chunk identifier ID equal to 5, and referring a free memory chunk of 11 bytes at an offset of 38 bytes from the beginning of the managed area MA.

Figure 3:
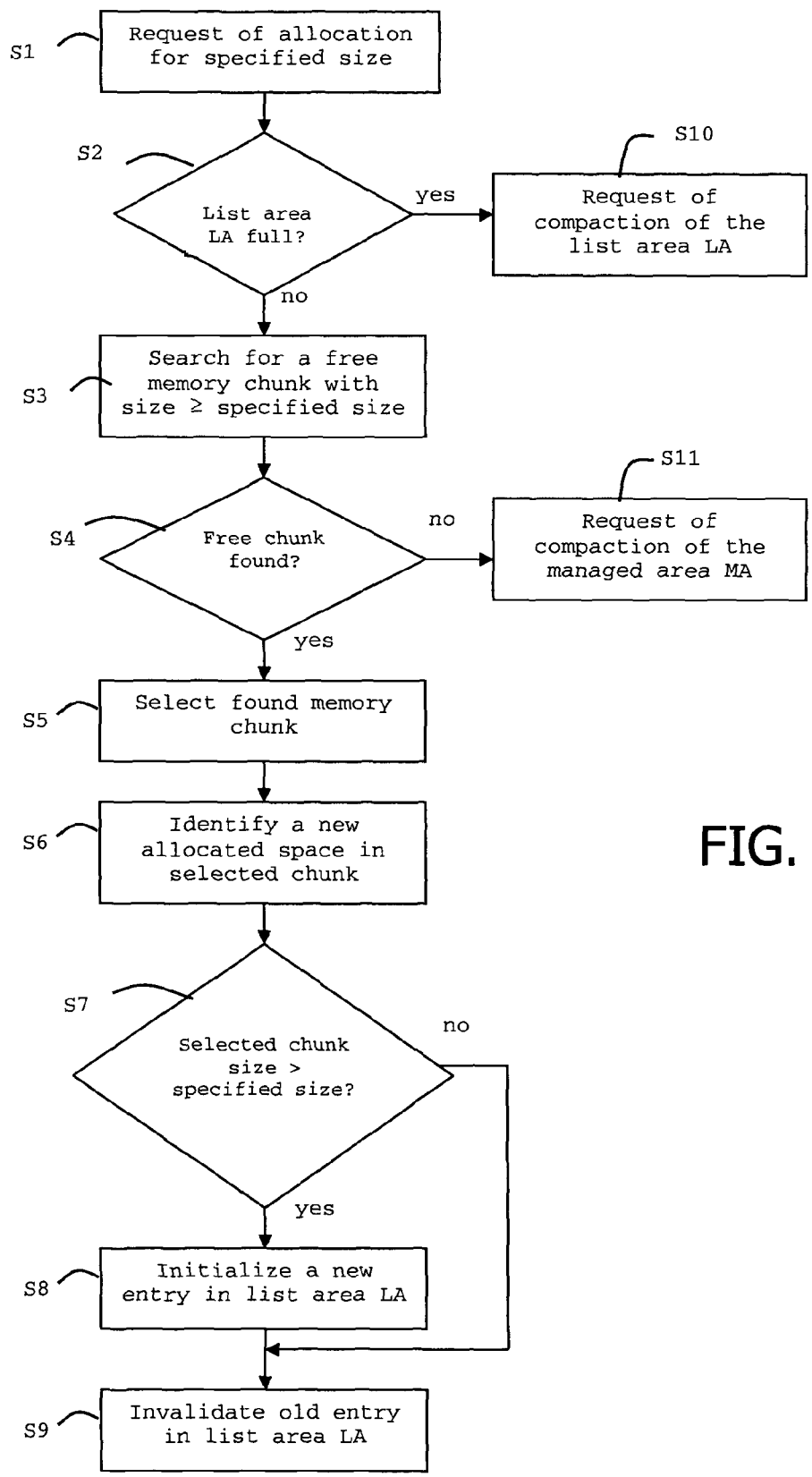
FIG. 3 is an algorithm for managing allocation of space in flash memory according to the invention.

FIG. 3 shows an algorithm for managing allocation of space in flash memory according to the invention. First, at step S1, a request of allocation is issued. This request contains a requested size. Then a check is done at step S2 to verify if the list area LA is not full and allows initializing a new entry.

If the list area. LA is full then a request of compaction of the list area LA is issued at step S10.

If the list area LA is not full then a search for a free memory chunk having a size equal to or higher than the requested size is launched at step S3.

When searching a free memory chunk, a scan of the list area LA is performed. For each entry, the availability field AF is first checked. If availability field AF is set to "used" value then a check is performed on the state field SF. If the state field SF is set to "valid" value, then a comparison is done between the memory chunk length CL and the requested size. The scan loops on the list area LA until a relevant entry is found or the end of the list area LA is reached.

At step S4, if no free memory chunk has been found then a request of compaction of the managed area MA is issued during step S11. The managed area MA may be highly fragmented and potentially contains many small free chunks.

If a free memory chunk has, been found then the found memory chunk is selected at step S5.

Then at step S6, a new allocated space having the requested size is identified in the selected chunk.

At step S7, a check is performed to verify if there is remaining free memory in the selected memory chunk that is not required for the new allocated memory space.

If the size of the selected memory chunk is higher than the required size, then a new entry is initialized in the list area LA at step S8.

Then the old entry referencing the selected chunk is invalidated at step S9, whatever the result of the check at step S7.

In an alternative embodiment, the check of step S2 may be performed after the step S7 if the size of the select chunk is higher than the requested size.

Figure 4:
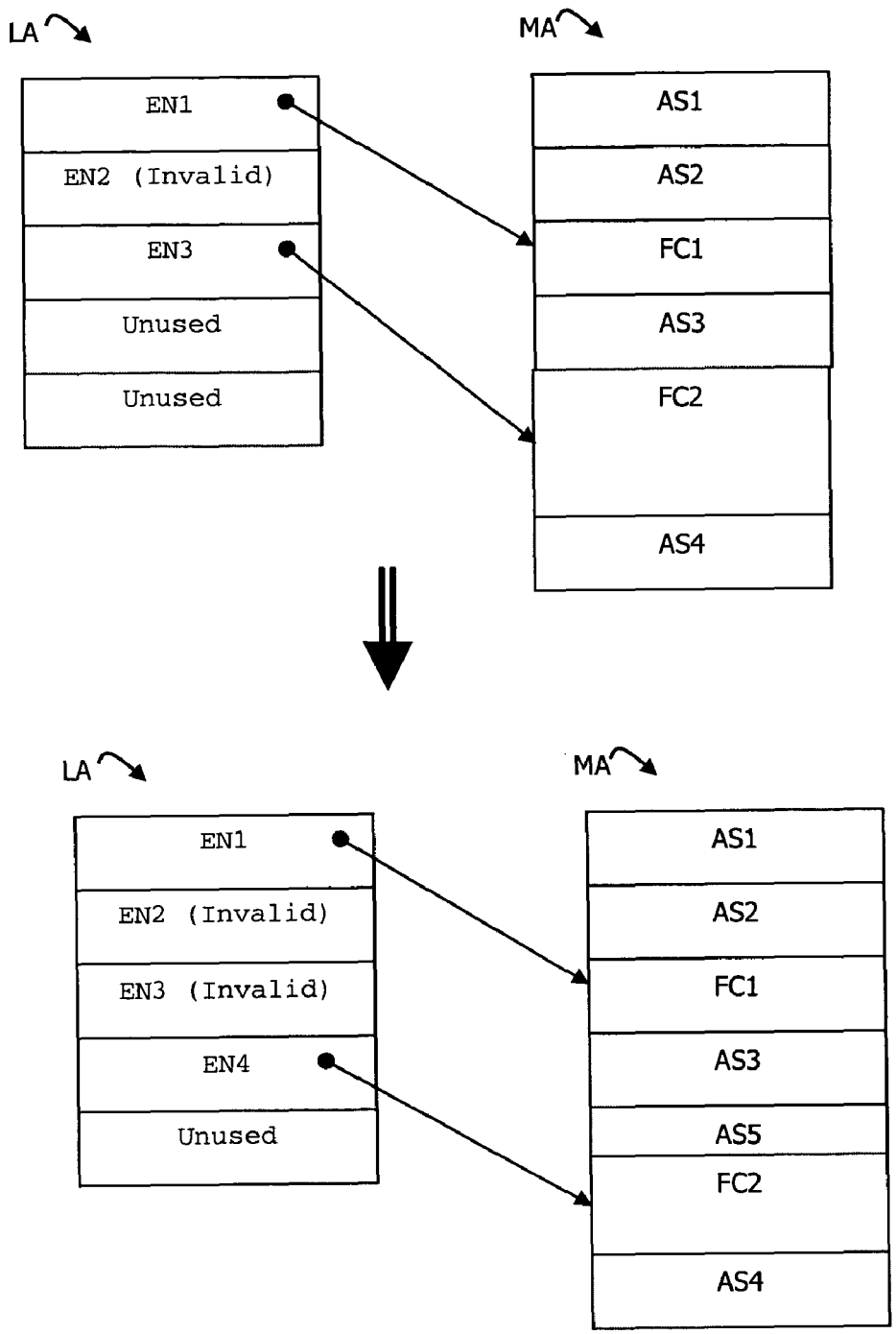
FIG. 4 depicts an example of flash memory state before and after a space memory allocation in the managed area.

An example of split of a selected free memory chunk is shown at FIG. 4. In a first state, the list area LA contains two valid entries EN1 and EN3 and one invalid entry EN2. In this example, the maximum number of entries of the list area is limited to five. The managed area MA contains two free memory chunks FC1 and FC2 are and four allocated memory spaces AS1, AS2, AS3 and AS4. If the second free chunk FC2 is selected at step S5, and if the selected free chunk has a size higher than the requested size, the first part of the selected chunk may be dedicated to the newly allocated space AS5 and the last part of the selected chunk remains a free memory chunk FC2. The old entry EN3 referencing the selected chunk FC2 is invalidated by changing the bit value of the state field SF to 0. A new entry EN4 is initialized in the list area LA by changing the bit value of the availability field AF to 0. This new entry EN4 references the remaining free chunk FC2 with a memory chunk length CL set to old FC2 length−requested size. The new entry EN4 has memory chunk offset CO set to old FC2 offset+requested size.

Figure 5:
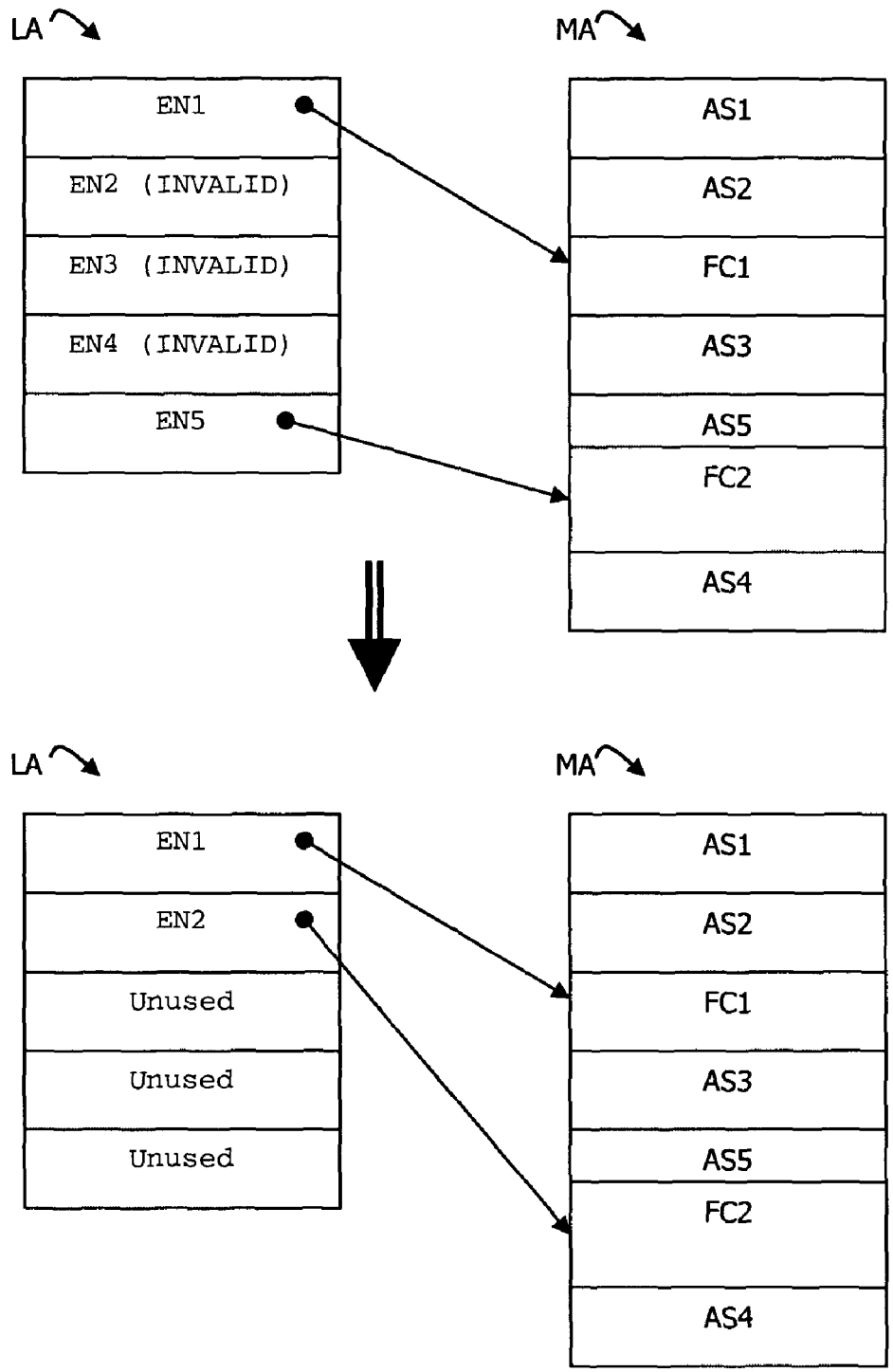
FIG. 5 depicts an example of flash memory state before and after a list area compaction.

FIG. 5 shows an example of compaction of the list area LA. In a first state, the list area LA contains two valid entries EN1 and EN5 and three invalid entries EN2, EN4 and EN4. The managed area MA contains two free memory chunks FC1 and FC2 are and five allocated memory spaces AS1, AS2, AS3, AS4 and AS5.

The list area LA compaction may be made in a volatile buffer previously initialized to 0xFF. Each valid entry is then loaded into the buffer and collapsed with others if necessary. During the loading operation, entries may be arranged by referenced offset in the ascending order. The free memory chunk identifier ID of each entry is modified to reflect its position in the ordered list. Then the buffer is finally flushed in the list area LA.

In the example of FIG. 5, the list area LA contains finally two valid entries EN1 and EN2 and no invalid entry. The managed area MA remains unchanged. The list area LA compaction avoids saturation problem due to the limited number of entries in the list area LA.

Each time a new entry is initialized in the list area LA, a new free memory chunk identifier ID must be computed.

If the new entry corresponds to a new free memory chunk, then a new free memory chunk identifier ID is computed so that the new free memory chunk identifier ID is higher than all existing free memory chunk identifiers.

If the new entry corresponds to a previously existing free memory chunk whose size changed, then the new free memory chunk identifier ID is equal to the free memory chunk identifier ID corresponding to the previously existing free memory chunk. In other words, even if the size of a free memory chunk changes, the associated free memory chunk identifier ID remains unchanged.

Alternately, the consistency of the list area LA may be checked at the smart card reset or before accessing the list area LA. A scan of all valid entries is performed. If two valid entries own the same free memory chunk identifier ID then the valid entry which was initialized most recently in the list area LA must be considered as invalid. Consequently its validity indicator is cleared to 0. Such a check of the list area LA consistency allows avoiding wrong effects of a tear or a power cut.

An advantage of the invention is to allow an allocation system that is designed to atomically allocate a new memory space. In other words, a unique basic programming operation allows validating, the allocation of a memory space. In particular such an allocation system avoids opening a transaction for ensuring the coherence of the allocation system and for avoiding memory leaks in case of tearing.

When the managed area MA is a java heap, another advantage of the invention is to allow the use of free memory chunks released during the garbage collection without requiring a compaction operation of the managed area.

The invention claimed is:

1. A method of managing flash memory allocation in an electronic token comprising:
   selecting, from a memory, a first free memory chunk of a plurality of free memory chunks further to an allocation request,
      wherein the memory comprises a list area and a managed area,
      wherein the managed area comprises a plurality of allocated spaces and the plurality of free memory chunks,
      wherein the list area comprises a first valid entry of a plurality of valid entries, the first valid entry referencing the first free memory chunk comprising the first free memory chunk,
      wherein the first valid entry comprises a state field preset with a virgin state and a memory chunk identifier associated with the first free memory chunk;
   identifying a new allocated space in the first free memory chunk;
   invalidating the first valid entry referencing the first free memory chunk; and
   initializing a new valid entry in the list area when the new allocated space is allocated in the first free memory chunk, wherein the new valid entry references a second free memory chunk of the plurality of free memory chunks and has the same memory chunk identifier as the first free memory chunk.

2. The method of claim 1, wherein the first valid entry is invalidated by writing a predefined value in the state field.

3. The method of claim 1, further comprising:
   requesting a compaction of the list area when said list area comprises a predefined number of valid entries.

4. The method of claim 3, wherein the plurality of valid entries are sequentially initialized in the list area.

5. The method of claim 1, wherein each of the plurality of allocated spaces and each of the plurality of free memory chunks is defined by their own size, and wherein said method further comprises:

initializing the new valid entry in the list area if the new allocated space size is smaller than a size of the first free memory chunk.

6. The method of claim 5, wherein the allocation request is defined by a size, and wherein said method further comprises:
   requesting a compaction of the managed area when the allocation request size is bigger than an individual size of each of the plurality of free memory chunks.

7. An electronic token, comprising:
   a microprocessor,
   a memory comprising a list area and a managed area, said managed area comprising a plurality of allocated spaces and a plurality of free memory chunks, said list area comprising a first valid entry referencing a first free memory chunk of the plurality of free memory chunks, said first valid entry comprising a state field and a memory chunk identifier associated with the first free memory chunk,
   wherein the state field is preset with a virgin state, and
   wherein said electronic token is configured to:
      identify a new allocated space in the first free memory chunk of the plurality of free memory chunks, and
      invalidate the first valid entry referencing the first free memory chunk,
   wherein, when the new allocated space is allocated in the first free memory chunk, a new valid entry is initialized in the list area, wherein the new valid entry references a second free memory chuck of the plurality of free memory chunks and has the same memory chunk identifier as the first free memory chunk.

8. The electronic token of claim 7, wherein the first valid entry comprises at least one availability field indicating if the first valid entry is used or unused, and wherein the unused value corresponds to a virgin state of the availability field.

9. The electronic token of claim 7, wherein a number of valid entries initialized in the list area is limited to a preset threshold.

10. The electronic token of claim 7, wherein the memory is a NOR flash memory.

11. The electronic token of claim 7, wherein the electronic token (ET) is one selected from a group consisting of a smart card, a mobile phone, a portable audio device, a portable navigation device, and a memory token.

* * * * *

UNITED STATES PATENT AND TRADEMARK OFFICE
CERTIFICATE OF CORRECTION

PATENT NO. : 8,200,937 B2
APPLICATION NO. : 12/663014
DATED : June 12, 2012
INVENTOR(S) : Franck Dehlinger et al.

It is certified that error appears in the above-identified patent and that said Letters Patent is hereby corrected as shown below:

In the Claims:

In Claim 1, column 5, line 22, the words "comprising the first free memory chunk" should be omitted.

Signed and Sealed this
Twenty-eighth Day of August, 2012

David J. Kappos
*Director of the United States Patent and Trademark Office*